US005236015A

United States Patent [19]

Schwelm

[11] Patent Number: 5,236,015

[45] Date of Patent: Aug. 17, 1993

[54] POSITION-CONTROLLED PROPORTIONAL DIRECTIONAL VALVE

[75] Inventor: Hans Schwelm, Luxembourg-Domeldange, Luxembourg

[73] Assignee: Hydrolux S.a.r.l., Luxembourg, Luxembourg

[21] Appl. No.: 856,641

[22] Filed: Mar. 24, 1992

Related U.S. Application Data

[62] Division of Ser. No. 620,419, Dec. 3, 1990, Pat. No. 5,144,983.

[30] Foreign Application Priority Data

Dec. 13, 1989 [LU] Luxembourg .......................... 87640

[51] Int. Cl.$^5$ ..................... F16K 11/02; F16K 31/124

[52] U.S. Cl. .......................... 137/625.18; 137/625.48; 137/625.64; 251/30.02

[58] Field of Search ...................... 137/625.18, 625.34, 137/625.64, 625.48; 251/30.02

[56] References Cited

U.S. PATENT DOCUMENTS

| | | | |
|---|---|---|---|
| 2,615,466 | 10/1952 | Garde | 137/625.6 |
| 3,339,573 | 9/1967 | Bahniuk | 137/625.64 X |
| 3,757,823 | 9/1973 | Knutson | 137/625.64 |
| 3,783,901 | 1/1974 | Schneider et al. | 137/625.64 |
| 4,593,719 | 6/1986 | Leonard | 137/625.64 X |

FOREIGN PATENT DOCUMENTS

| | | |
|---|---|---|
| 2926547 | 1/1981 | Fed. Rep. of Germany . |
| 2932810 | 2/1981 | Fed. Rep. of Germany . |
| 2938889 | 4/1981 | Fed. Rep. of Germany . |
| 2942754 | 5/1981 | Fed. Rep. of Germany . |
| 3708570 | 9/1988 | Fed. Rep. of Germany . |
| 2508565 | 12/1982 | France . |
| 2585415 | 1/1987 | France . |
| 2000883 | 1/1979 | United Kingdom . |

*Primary Examiner*—Gerald A. Michalsky
*Attorney, Agent, or Firm*—Mason, Fenwick & Lawrence

[57] ABSTRACT

A position controlled proportional directional control valve has a main control piston for controlling flow between passages to a pump, a tank, and to passages which may be connected to an operative device, such as a hydraulic motor. The main control piston may be moved in one direction by an operating piston slidably disposed in a centring flange which serves as a mechanical stop for movement of the main control piston in the opposite direction. Acting on the end of the main control piston opposite the operating piston is a centring piston having one end in a pilot control chamber, and which may urge the main control piston against the centring flange either by pressure fluid in the chamber, or upon failure of pressure, by the spring in the chamber. A pilot control valve, under the control of an electrical magnet, moves proportionally to the current in the electrical magnet, to admit fluid under pressure from a pump passage into the pilot control chamber.

5 Claims, 3 Drawing Sheets

POSITION-CONTROLLED PROPORTIONAL DIRECTIONAL VALVE

Figure 1:
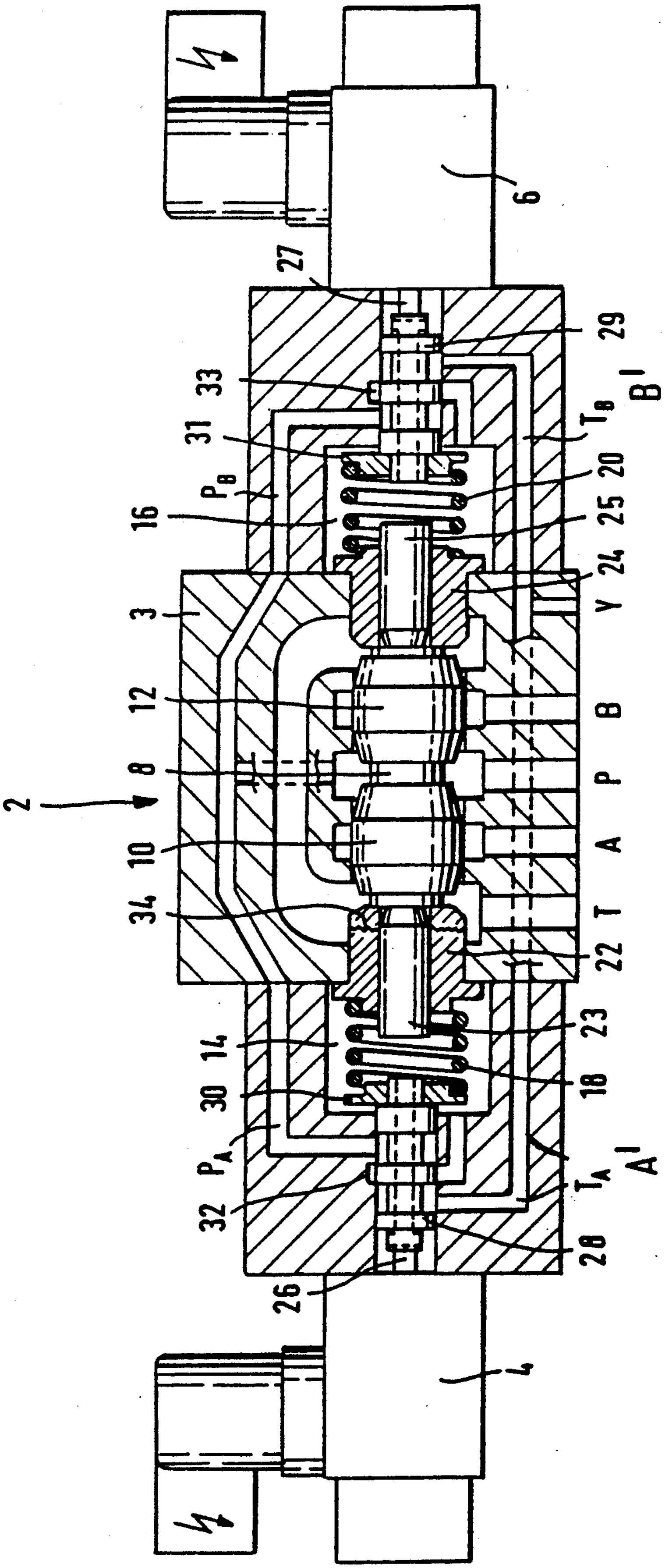

This application is a division of application Ser. No. 07/620,419 filed Dec. 3, 1990, now U.S. Pat. No. 5,144,983.

The invention relates to a position-controlled proportional directional valve for use in hydraulic systems, in particular a proportional direction valve with a main control piston and two coaxial piston collars integrally connected thereto, for the optional activation of a first or second operating line.

The conventional position-controlled proportional directional valves for the said purpose operate with a displacement pick-up, which constantly senses the position of a main control piston and converts it into a control voltage $U_x$. By means of a control electronics, a set value $U_w$—actual value $U_x$ comparison is carried out externally and a pilot control valve is energised by a current signal corresponding to the system deviation and the main control piston adjusts against the system deviation.

Depending on type, these conventional proportional valves have more or less serious drawbacks, in particular from the safety aspect (fail safe). Since the position of the main piston is electrically monitored, the controlled system is interrupted in the event of a line break, installation fault or damage and the main piston moves to one of the two end positions. If there is no additional monitoring of the displacement pick-up for a cable break, the main piston consequently assumes an indeterminate position, and an automatic centring in centre position is not ensured and as a result, the cylinders to which the valve is connected cannot be stopped.

Other types of valve have so-called pilot control servovalves, which are not spring-centred. That means that their position is current-dependent. In the event of a power failure, it is impossible in this case to centre the main piston in the centre position, provided there is still control oil pressure available. In the event of a power failure, it would not be possible to stop a connected hydraulic unit.

In the case of other proportional valves, neither pilot control-stage nor main-stage pistons are spring force-centred, meaning that they are only reliably operational with control-oil control and at the same time positional control. If just one of the two prerequisites is not met, the valve cannot be positioned controllably in the centre position.

To avoid these drawbacks of the position-controlled proportional directional valves according to the prior art, it is the object of the invention to provide a valve of the type mentioned above beginning which, in the event of failure of the electronic activation, is always positioned in the centre position by pressure centring and, in the event of failure of the pilot control pressure, is spring-centred, all connections, i.e., to the pump, the tank and to the two conduits to a hydraulic cylinder being closed in this centre position of the main piston, so that no movement of the connected hydraulic cylinder or motor can take place, which for example in the case of hydraulic presses is very important; which is extremely robust; is insusceptible to faults and which is operationally reliable and with which it is virtually impossible, even by use of external force, or incorrect commissioning or installation, to upset the control of the valve.

These objects are achieved in a first embodiment by a position-controlled proportional directional valve of which the main control piston is controlled hydraulically by two pilot control slide valves, each operated by control electrical or electro-magnets with force build-up proportional to the electric control current, feedback taking place of the position of the main control piston to the operated pilot control slide valve, characterised in that a main control piston can be positioned in a housing by two centring flanges, prestressed with springs, and by displaceable operating pistons, fitted concentrically therein, by means of the control pressures predetermined by the pilot control slide valves, the centring flanges hydraulically returning the main control piston as far as the pressure-centred centre position when the pilot control chambers are pressurised, effected by their rear annular face, pressure-relieved with respect to the tank connection T, and in that the position of the main control piston can be fed back in a control loop to the pilot control slide valves.

Furthermore, when these proportional directional valves are, for example, installed in hydraulic press controls, it is required that, for accident prevention, when the guard door to the press chamber is opened there takes place via a separate guard door valve a hydraulic control operation which interrupts the pressure oil inflow to the press cylinder by returning the main control piston into the centre position, so that the closing movement of the press is stopped. Furthermore, a closing of the press will only be possible when a further additional solenoid valve is switched by the master electrical control to release the closing movement, and only then, with simultaneous activation of the proportional directional valve, is actuation of its main control piston possible.

Until now, these requirements were only met by the installation of additional piston slide valves between the pilot control valve and the main control stage.

In a special embodiment providing the solution according to the invention, the reliability for such construction is decisively improved by the described two additional valve functions between pilot control valve and main control stage being achieved by a seat valve having enhanced switching reliability with respect to piston slide valves. The seat valves particularly used for this, a 3/2-way seat valve operated hydraulically by the guard door valve and a solenoid-operated 3/2-way seat valve, are known.

What is technically novel about the invention is the connection, as disclosed herein, of these valves into the hydraulic activation of the pressure-centred and spring-centred proportional directional valve such that, with extreme functional reliability, the closing movement in hydraulic press controls can only take place by additional hydraulic and electrical operation of two seat valves.

The invention in another embodiment provides a position-controlled proportional directional valve of which the main control piston can be controlled hydraulically by one pilot control slide valve, operated via a control electrical or electro-magnet with force build-up proportional to the electric control current, feedback taking place of the position of the main control piston to the pilot control slide valve, characterised in that for the adjustment of the main control piston by the proportional directional valve with a control magnet upon pressure relief in the pilot control chamber, a constantly pressurised operating piston is fitted displaceably in a centring flange firmly held against the valve housing by an end cap, and a centring piston having a greater thrust face in relation to the operating piston is fitted displaceably in the valve housing for hydraulic return upon pressure build-up in the pilot control chamber.

Figure 2:
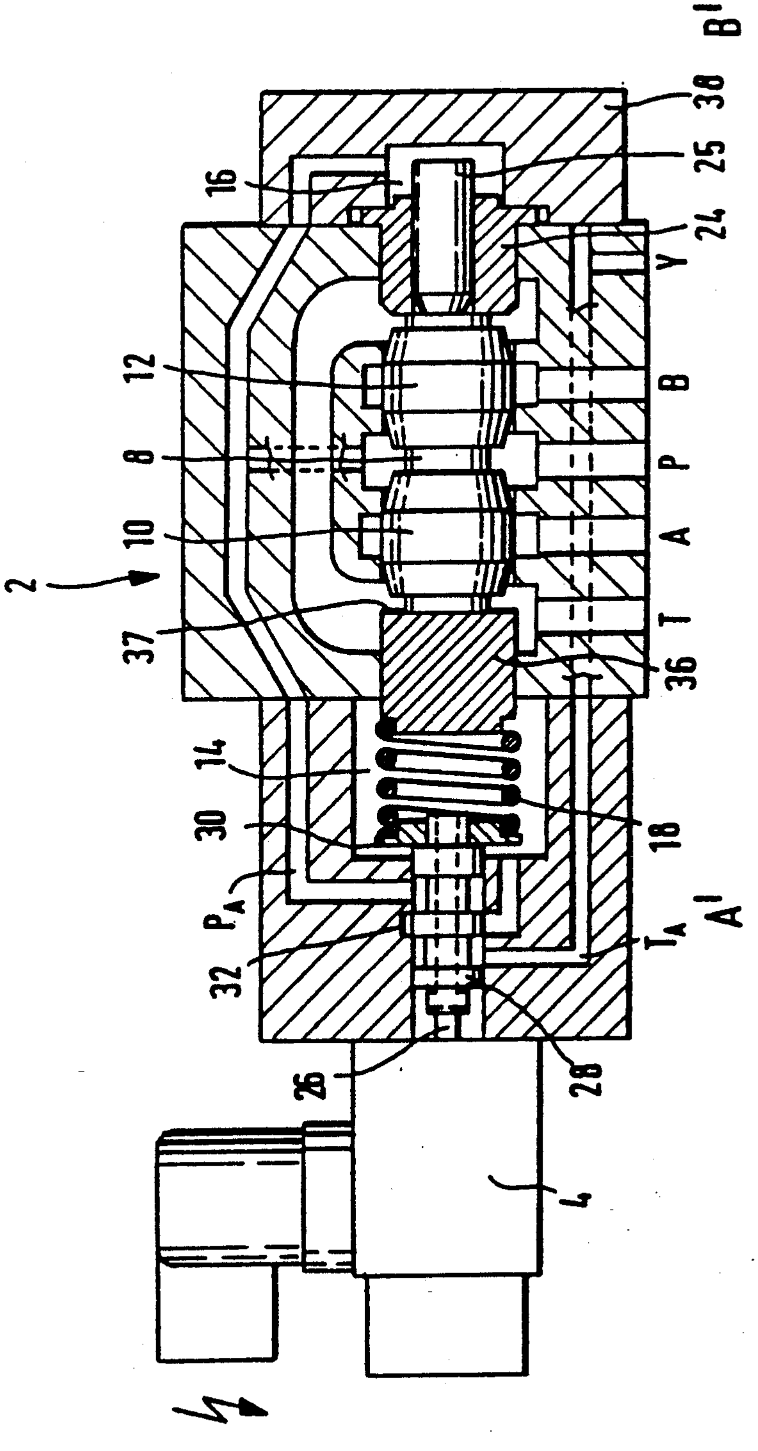
Figure 3:
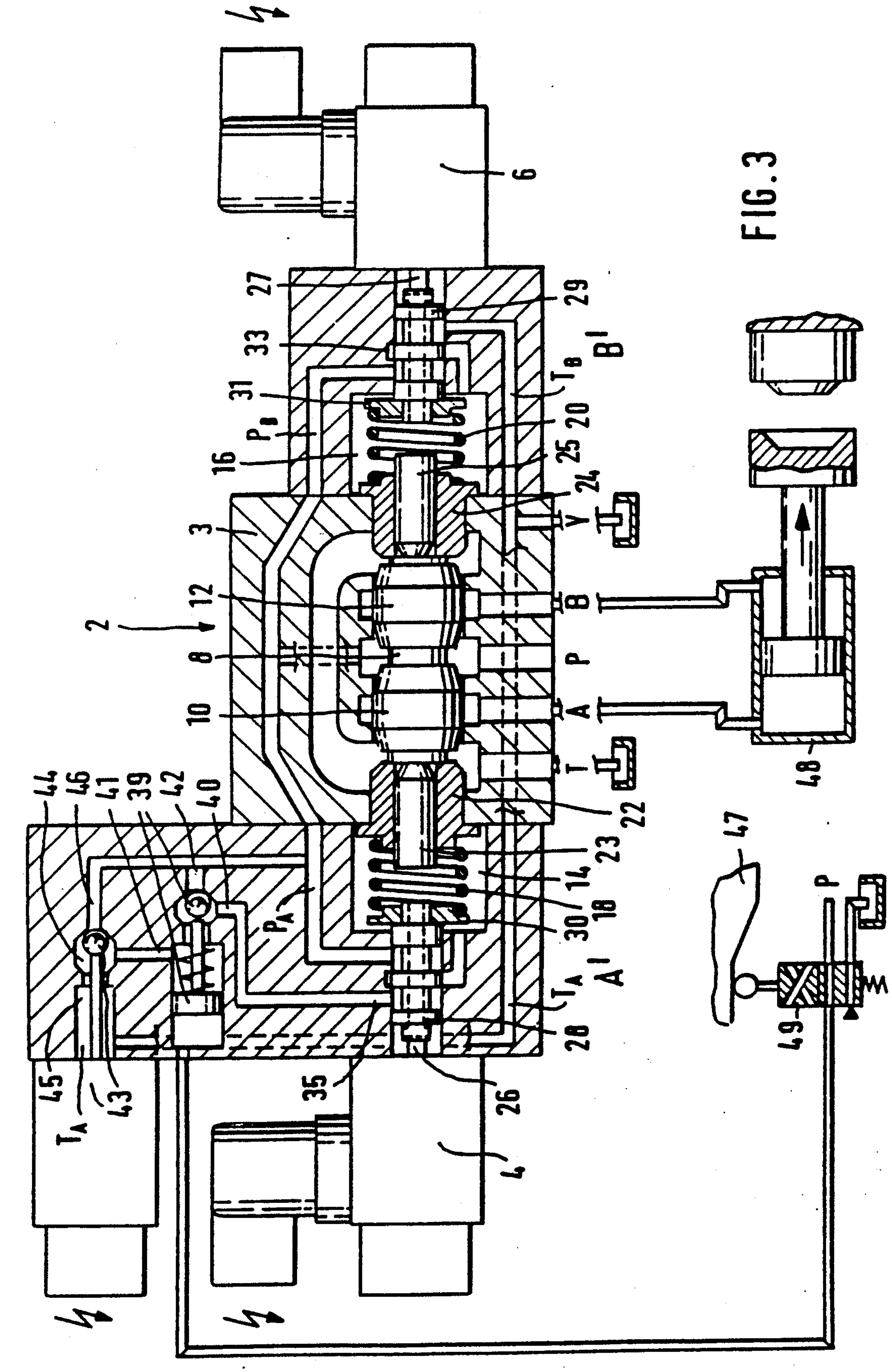

Exemplary embodiments of the invention are described in further detail below and are represented in the drawing, in which:

FIG. 1: shows a longitudinal section through the valve according to the invention with two electrical control magnets;

FIG. 2: shows a modified design of the proportional directional valve;

FIG. 3: shows a design of a proportional directional valve with integrated 3/2-way seat valves.

The valve 2 is completely symmetrical in its essential construction, having the usual connections P (pump connection), T (tank connection), A (first operating line connection), B (second operating line connection), Y (control line connection to the tank) as well as two electrical control magnets 4 and 6, the left-hand pilot control valve side A' being assigned to the operating line A and the right-hand pilot control valve side B' being assigned to the operating line B in the figure.

The operating part of the valve has, in the usual way, a main control piston 8, which is integral with two coaxial piston collars 10, 12, the piston collar 10 being assigned to the operating line A and the piston collar 12 to the operating line B.

The left-hand operating piston 23 is guided freely movably through the centring flange 22 and is pressurised by an A'-side pilot control chamber 14, the right-hand one 25 is guided freely movably in 24 and is pressurised by a B'-side pilot control chamber 16. The main control piston 8 is held in its neutral centre position by means of springs 18, 20 and centring flanges 22, 24, in a usual way per se, when in the case of pressure failure in the system the pilot control chambers 14, 16 are pressureless (spring centring). In the case of pressure in the system (connection P) and de-energised control magnets 4, 6, both pilot control chambers 14, 16 are pressurised, since they are connected to the pump connection $P_A$ and $P_B$, respectively, via the pilot control slide valves 28, 29, operated outwards in each case by the prestressed springs 18, 20. The centring flanges 22, 24 are thereby pressed against their stops in the valve housing 3 by great pressure forces, since they are pressure-relieved on their rear side to the respective T connection over the annular face 34. As a result, the main control piston 8 is pressure-centred in its centre position. The two pilot control slide valves 28, 29 are provided with axial through-bores in order to permit a pressure equalisation on both sides during displacement.

Since the mode of operation typical for the invention is identical for both valve sides A' and B', the following statements can confine themselves essentially to one of these two sides, for example the side A'.

The control magnet 4 operates with its tappet 26 a pilot control slide valve 28 of a usual type with its pump connection $P_A$ and its tank connection $T_A$ against the returning force of the spring 18 and connects the pilot control chamber 14 pressurelessly to Y via the ring channel 32. Since the pilot control chamber 16 is pressurised via the pilot control slide valve 29, located in its position of rest by the spring 20, and via the $P_B$ connected ring channel 33, the operating piston 25 displaces the main control piston 8 against the centring flange 22 and the spring 18 bearing against the latter. In proportion to the stroke of the main control piston 8 there develops in the spring 18 an additional feedback force, which is fed back via the spring plate 30 to the pilot control slide valve 28 and is compared with the tappet force of the control magnet 4. The tappet force is, for its part, proportional to the input magnet current. Consequently, the position of the main control piston 8 with respect to the magnet current or the magnet force is achieved very accurately in a closed position control loop with spring feedback and force comparison at the pilot control slide valve 28.

When the control magnet 4 is relieved, the prestressing force of the spring 18 predominates and the pilot control chamber 14 is pressurised again via the ring channel 32 of the pilot control slide valve 28. Since the pressure force of the cross-sectional area formed by the centring flange 22 with the operating piston 23 contained therein is greater by the pressure force component of the annular face 34 than the pressure force only of the operating piston 25 of the opposite B' side the main control piston is returned according to the force reduction of the control magnet 4, at most up to the housing stop of the centring flange 22.

For a movement of the main control piston 8 towards the B' side upon operation of the control magnet 6, the operations described for the A' side proceed analogously.

It can easily be seen from the drawing that in the case of pressure failure in the pilot control chamber 14, 16, the two springs 18, 10 centre the main control piston 8 in its centre position via the centring flanges 22, 24, so that all the connections P, T, A and B are closed, whereas in the case of failure of the electrical activation the two pilot control chambers 14, 16 pressure-centre the valve by their connections $P_A$ and $P_B$, respectively, so that an undesired movement of connected hydraulic components cannot take place in either of these two cases.

Since the position control of the main control piston only takes place by spring force comparison, the valve is extremely robust, insusceptible to faults and operationally reliable.

It is virtually impossible by use of external force, or incorrect commissioning or installation to upset the control of the valve. All the functionally decisive elements are physically integrated in the valve.

Due to the internal feedback and position control in the case of the valve according to the invention, no displacement pick-up with associated external electronic control is necessary any longer.

FIG. 2 shows, in a modified design, a longitudinal section through the proportional directional valve according to the invention with an electrical control magnet for the activation of the main control piston from the centre position towards just one side. This construction is frequently used as a proportional throttle valve with only one direction of throughflow. The B'- side pilot control slide valve 29 of the embodiment of FIG. 1 is replaced by an end cap 38, which holds the centring flange 24 against the valve housing, and includes a pilot control chamber 16, the fluid pressure in which constantly pressurises the operating piston 25. As shown in FIG. 2, the centring flange 24 provides a stop for the main control piston 8, and is in axial alignment with the adjacent end face of main control piston 8, as is the operation piston 25 which is guided for axial movement in the centring flange 24. In the case of de-energised control electrical or electro-magnet 4, the pilot control chamber 14 is pressurised via the pilot control slide valve 28 actuated with respect to the pressure connection $P_A$ by the prestressed spring 18, so that the centring piston 36, with its thrust face 37, relieved with respect to the tank and greater in comparison with the operating piston 25, pressure-centres the main control piston 8 into its centre position against the fixed centring flange 24. In the case of a pressureless system, centring action additionally is caused by the spring 18. The mode of operation in the case of actuation via control magnet 4 is the same as previously described in the case of the design according to FIG. 1. Note that centering piston 36 and main piston 8 may be integral.

FIG. 3 shows a longitudinal section through the proportional directional valve according to the invention, having two additional 3/2-way seat valves integrated in the hydraulic pilot control of a valve side A' or B', which seat valves have to be operated by a master machine control in accordance with the safety requirements of the machine for release of the main control piston position, predetermined by the control magnet.

The following statements relate to the arrangement of these additional safety functions on the A' side. The functions in the case of arrangement on the B' side or on both sides A' and B' are corresponding.

For example, in order that a press closing movement can take place by actuating the main control piston 8 proportionally to the activation of the control magnet 4, with guard door 47 closed, for securing the press chamber 48 it is necessary for a 3/2-way seat valve 39 to be operated hydraulically by pressure via a relieved guard door valve 49 and at the same time for a solenoid to have switched a 3/2-way seat valve 43, in order that the tank connection 35 of the pilot control slide valve 28 is pressurelessly relieved by the lines 40, 41 to the tank. Only then can the main control piston 8 assume the position predetermined by the control magnet 4 and control the closing speed of the press cylinder. When opening the guard door 47, the guard door valve 49 is operated and the 3/2-way seat valve is hydraulically relieved, whereby the tank connection 35 of the pilot control slide valve 28 is pressurised via the connection 42, and the main control piston 8 moves into the centre position by pressure centring, irrespective of the activation of the control magnet 4 by pressure build-up in the pilot control chamber 14.

The safety valve additionally designed as solenoid-operated 3/2-way seat valve 43 is connected in series with the valve 39.

If the solenoid-operated 3/2-way seat valve 43 is not activated for release of the press closing movement, the tank connection 35 of the pilot control slide valve 28 is likewise pressurised via connection 46 even with operated 3/2-way seat valve 39, so that the main control piston is pressure-centred into the centre position.

By this arrangement, the use of seat valves and the hydraulic pressure centring, an extremely high level of safety is achieved in stopping the press closing movement by the master machine control.

I claim:

1. A position-controlled proportional directional valve comprising:

a housing;

a main control piston slidably displaceable in said housing in one direction from a center position, said main control piston having a first end and a second end;

mechanical centering means fixed with respect to said housing for engaging said first end for stopping displacement of said main control piston in the center position thereof;

an operating piston fitted slidably in said housing in axial alignment with said first end of said main control piston, said operating piston having a first and a second end, said first end of said operating piston engaging said first end of said main control piston for applying a force to and for receiving a force from said main control piston;

a first pressure chamber having the second end of said operating piston therein;

passage means for connecting said first pressure chamber to a pump;

a centering piston slidable in said housing in axial alignment with said second end of said main control piston, said centering piston having a first end and a second end, said first end of said centering piston comprising means for axially applying a force to and for receiving a force from said main control piston and said second end thereof having a bigger effective surface area than said second end of said operating piston;

a second pressure chamber having said second end of said centering piston therein;

means for selectively supplying a pressure fluid to and for relieving a pressure fluid from said second pressure chamber comprising a pump passage for connection to a pump, a tank passage for connection to a tank, a passage to said second pressure chamber, and a pilot control slide valve, said pilot control slide valve having a first end and a second end with said first end thereof being in said second pressure chamber;

a spring located in said second pressure chamber, said spring bearing on said second end of said centering piston and on said first end of said pilot control slide valve and urging said main control piston against said mechanical centering means in said center position of said main control piston;

a single electromagnet control means for exerting a force proportional to electric control current supplied thereto, said single electromagnet control means engaging said second end of said pilot control slide valve to cause displacement thereof from a position in which said passage to said second pressure chamber communicates with said pump passage to a position in which said passage to said second pressure chamber communicates with said tank passage.

2. A position-controlled proportional directional valve in accordance with claim 1, wherein said mechanical centering means for stopping the main control piston in said center position comprises a centering flange in axial alignment with said first end of said main control piston.

3. A position-controlled proportional directional valve in accordance with claim 2, wherein said operating piston is axially guided in said centering flange.

4. A position-controlled proportional directional valve in accordance with claim 3, wherein said centering flange is fixed to said housing by an end cap having said first pressure chamber therein.

5. A position-controlled proportional directional valve in accordance with claim 1, wherein said main control piston is integral with said centering piston.

* * * * *